H. J. MURRAY AND W. S. RUGG.
YIELDABLE GEARING.
APPLICATION FILED JULY 2, 1920.
1,390,538.
Patented Sept. 13, 1921.
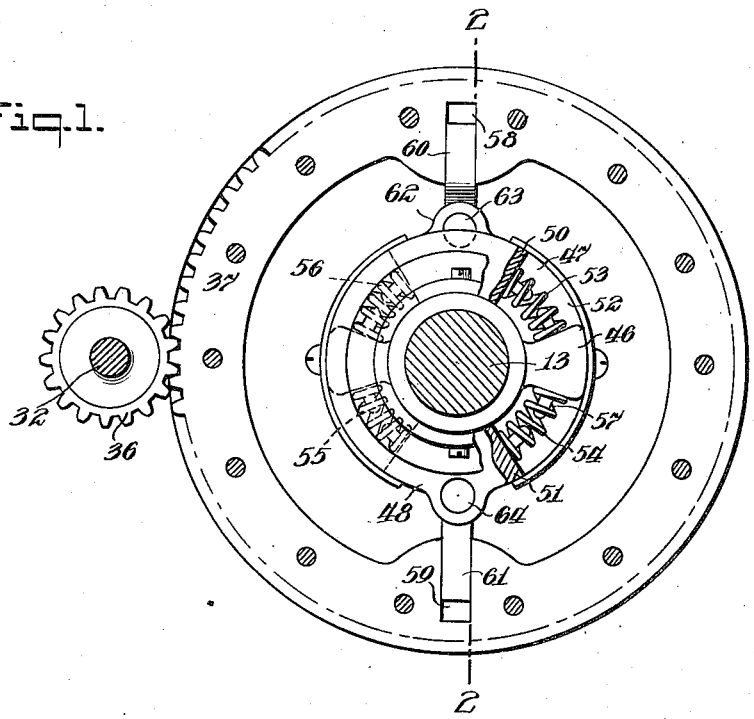
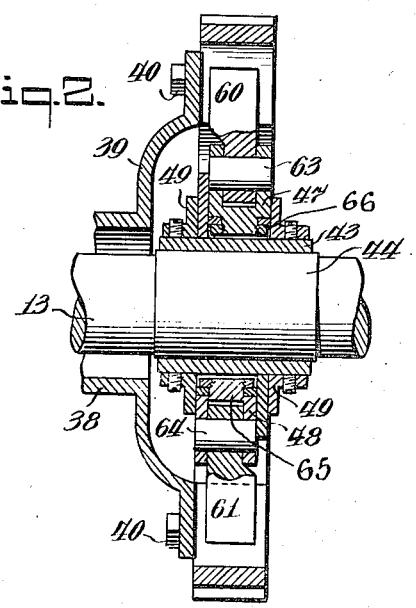
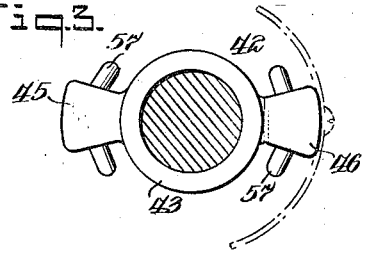
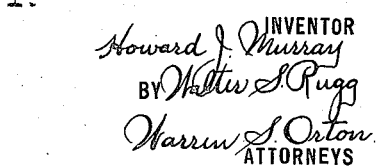
INVENTOR
Howard J. Murray
BY Walter S. Rugg
Warren S. Orton
ATTORNEYS

UNITED STATES PATENT OFFICE.

HOWARD J. MURRAY, OF BROOKLYN, NEW YORK, AND WALTER S. RUGG, OF PITTSBURGH, PENNSYLVANIA.

YIELDABLE GEARING.

1,390,538. Specification of Letters Patent. Patented Sept. 13, 1921.

Original application filed May 27, 1918, Serial No. 236,856. Divided and this application filed July 2, 1920. Serial No. 393,544.

*To all whom it may concern:*

Be it known that we, HOWARD J. MURRAY, a citizen of the United States, and a resident of Brooklyn, county of Kings, and State of New York, and WALTER S. RUGG, a citizen of the United States, and a resident of Pittsburgh, county of Allegheny, and State of Pennsylvania, have invented certain new and useful Improvements in Yieldable Gearings, of which the following is a specification.

The invention relates in general to a flexible power transmission system between two shafts or other forms of power transmitting member mounted to have a certain freedom of relative movement and the invention constitutes a division of our copending application, on resiliently mounted transmission, Serial No. 236,856, filed May 27th, 1918.

In the parent application a construction is disclosed in which the two shafts therein identified as the axle of a car truck and the armature shaft of the driving motor are resiliently supported relative to each other by the usual spring suspension found in conventional forms of car frames or rather truck frames of the character disclosed in said prior application.

In this dosclosure it is to be assumed in general in interpreting the broad claims that there is no necessity for any direct connecting means between the shafts and specifically considering a structure where the invention is particularly applicable there is assumed a connection preferably a resilient connection between the shafts as illustrated in the parent application.

Considered in its broad aspect, one of the objects of the invention is to provide a positive and efficient, flexible driving connection between two relatively movable shafts and in which one or both of the shafts are capable of not only longitudinal relative movement but also of relative universal articulation either in situations where one of the shafts is supported from the other or where the shafts are entirely independent except for the flexible connection featured in this disclosure.

Another specific feature of the invention is to provide a simple form of flexible element in the transmission herein featured which element will include a spring drive, substantially free of all strains thereon, except those incidental to the driving function of the transmission.

Still another object of the invention is to provide a simple, compact form of transmission which can be readily designed structurally to accommodate the transmission of high speed and high torque forces with the use of a relatively small amount of material and the incidental minimizing of any tendency to distortion of the parts while acting under heavy loads.

Still another object of the invention is to provide a form of spring drive which will maintain its maximum effective transmission characteristics under conditions where the shafts move angularly out of their normal relation.

Various other objects and advantages of the invention will be in part obvious from an inspection of the accompanying drawings and in part will be more fully set forth in the following particular description of one form of mechanism embodying our invention, and the invention also consists in certain new and novel features of construction and combination of parts hereinafter set forth and claimed.

In the accompanying drawings:—

Figure 1 is a view in elevation of a preferred embodiment of the invention shown in position disposed between two shafts shown in section in this figure;

Fig. 2 is a transverse sectional view taken on the line 2—2 of Fig. 1; and

Figs. 3 and 4 are views in side elevation respectively of the driven wing members and one of the traveling rings shown in Figs. 1 and 2.

In the following description and in the claims, parts will be identified by specific names for convenience of expression but they are intended to be as generic in their application to similar parts as the art will permit.

In the drawings there is disclosed two spaced apart and paralleling extending shafts 13 and 32 and which for the purpose of this disclosure may be considered as a driving power shaft 32 and a driven shaft 13. In the specific showing in the parent application shaft 32 is the armature shaft of a high speed motor and shaft 13 is an axle carrying flanged track engaging wheel at opposite ends as is usual in the running gear of electrically driven railway vehicles. In this description the shaft 32 will be considered as the driving member and the shaft 13 as the driven member but it will be obvious that the driving power may originate in the shaft 13 and be transmitted to the shaft 32 for the device illustrated may work either way. It might be further assumed for convenience of description that the shaft 32 is mounted so that its axis is fixed in position and the shaft 13 mounted so that its axis may be free to move, at least for a limited distance, both longitudinally and so that it is capable of a limited universal articulation relative to the shaft 32.

There is disclosed a reducing gear train which includes a small pinion 36 fixed to the shaft 32 and constantly meshing with a relatively large slow speed gear 37 which encircles the shaft or axle 13. The teeth of the gear and pinion are of the herring bone type and are so set relative to each other as to obtain the most effective driving organization. The gear 37 is supported with its axis fixed relative to the axis of the gear 32 by means of a long bearing engagement, which includes a hub portion in the form of a sleeve 38 which surrounds the shaft 13 but has an internal diameter greater than the diameter of the shaft so as to provide a clearance sufficient to permit all possible relative movement between the sleeve and shaft 13 in the shifting of the latter. One end of the sleeve hub portion 38 is provided with an outstanding dish shaped flange 39 affixed to the side of the gear 37 by means of bolts 40. A flexible driving connection is positioned within the plane of the gear 37 and is operatively connected thereto and to the shaft 13 to drive the same in all possible shifted positions of the latter relative to the gear.

The flexible connection includes a driven wing member 42 provided with a sleeve 43 shrunk on to an enlarged portion 44 of the axle. This member is provided with a pair of fish-tail shaped driving arms 45 and 46 extending diametrically therefrom in the plane of the gear 37. A pair of traveling rings 47 and 48 are loosely mounted upon the sleeve 43 and held centered thereon and in abutting position by means of a pair of flanged end collars 49 fixed to the sleeve 43 at opposite ends thereof. Each of the rings 47 and 48 are provided respectively with a laterally projecting raised portion 50 and 51 designed normally to extend diametrically opposite each other and on opposite sides of the driven shaft 13. One of the raised portions 50 is positioned between the driving arms 45 and 46 on one side of the driven shaft 13 and the other raised portion 51 is similarly positioned between the arms 45 and 46 on the opposite side of the shaft 13. The construction provides four spring containing spaces 52 between the succeeding arms and raised portions. These constitute bearing members for engaging opposite ends of four springs numbered clockwise in Fig. 1, as 53, 54, 55 and 56. The driving arms 45 and 46 and the raised portions 50 and 51 are provided with spring guiding pins 57 designed to be positioned in opposite ends of the spring so as to guide the same in the rotary movement of the traveling rings about the axle. By this construction it is seen that any pressure on either ring tending to turn the same about the axle will act through the spring drive to rotate the axle.

The gear wheel 37 is provided with a pair of inwardly facing and diametrically disposed guiding slots 58 and 59, the slot 58 containing a guiding arm 60 slidably mounted therein and the slot 59 being similarly provided with an arm 61 and both confined on their reciprocatory movement to a plane passing through the axis of the gear 37. The arms 60 is let into the bifurcated outer edge of an ear 62 forming an extension from the raised portion 50 and is pivoted thereto by means of a pin 63. The arm 61 is similarly pivoted to the raised portion of the ring 48 by means of a pivoting pin 64.

Preferably the arms 60 and 61 are mounted for rotary movement relative to the rings 47 and 48. For this purpose a shaft 65 projects inwardly from each of the ears 62, is passed through a socket opening formed in the raised portions 50 and is fastened in position by means of a nut 66.

In operation it will be understood that the shaft drive 32 at high speed transmits its rotary movement through a simple type of reducing gear train and flexible connection to the driving shaft 13. During this movement the axis of the driven gear will describe a small circle about the axis of the driven shaft which movement is possible due to the clearance provided by the hub sleeve 38. The axis of the driven shaft is free to move in any one of three planes at right angles to each other, or, in other words, the driven shaft is free to move in any direction relative to the driving shaft 32 and its attached parts. The axis of the driven shaft and the axis of the driven gear 37 are designed to coincide only under normal conditions of rest, as shown in Fig. 1, and are intended to move relatively to each other in the active operation of the device. The arms 60 and 61 not only move in and out of their guiding slots 58 and 59 but they may also move transversely of the plane of the gear with a twisting action. These arms of course never leave the diameter of the circle representing the gear and considering merely the rotary movement of the gear it is noted that in a complete cycle of movement of the arms, for instance arm 60, occupies the same position in its slot 58 that was previously occupied by the other arm 61 in its slot 59 when in the corresponding position. Therefore, when the center of the gear shifts away from the center of the driven shaft, while the arms are held in the diameter of the gear, the traveling rings must give and move about the axle and through an angle depending upon the amount of displacement between the axes of the gear and shaft relative to each other.

For a detailed explanation of the driving condition at some one point in its cycle of movement, let it be assumed that the gear 37 has been moved to the right in Fig. 1. In this case the diameter of the gear will lie to the right of the center of the axis but the arms 60 and 61 are held for movement in a straight line passing through the axis of the gear. This will slightly rotate the traveling ring about the axis of the axle and cause the rings to turn on their pivoting pins 63 and 64. In this illustration the traveling ring 47 has moved clockwise about the collar 43 and the ring 48 has been moved counter-clockwise. Moving the traveling ring 47 clockwise compresses the spring 53 to the right of it in Fig. 1, thus tending to move the driving arm 46 counter-clockwise and compressing the spring 54 against the ring 48 carrying the arm 61. It will thus mean that both springs 53 and 54 are under compression and bearing against the arm 46. The tension at this time is removed from the oppositely disposed springs 55 and 56 engaging the opposite driving arm 45. As the gear 37 is revolving at this time power is transmitted therefrom through the compressed spring 53 onto the driving arm 46 and therefrom directly through the collar 43 to the axle to turn the same. With the gear displaced and under motion, each of the springs will be compressed once against the arm 46 and once against the arm 45 in each revolution of the gear 37. Considering any given point on the arms 60 and 61 the movement of any such point in one complete revolution will conform to the sine law, the amplitude of its wave being determined by the displacement of the axis of the gear 37 and axle 13. By this construction it is possible for the axis of the axle to move radially of the gear 37 while it is being driven by the same.

Considering the situation in which the axis of the gear neither coincides with the axis of the axle nor is parallel thereto, it will be noted that this distortion has minimum effect on the efficiency of the drive. In this case the axis of the gear is not only offset but is making an angle with the driven shaft. The arms 60 and 61 in this case not only move radially of their guiding slots but may also move transversely of the plane of the gear and about a radius of their own. While this transverse movement, in the normal action of the axle is but slight, even this slight action is taken care of in this construction and in the tendency of the driven shaft to restore itself to normal position will cause the arms 60 and 61 to be restored to their normal position centered in their guiding slots.

By means of a device of this character it is possible to maintain a preset meshed gear driving connection in gear train and the flexible transmission provides for all necessary variation in the position of the driven shaft relative to the driving shaft while maintaining a positive drive between the last member of the gear train and the driven shaft in all positions of the same. The driven shaft is strictly a floating member for it is free to move practically without restraint from the connection of the flexible driving element fixed thereto. These springs are preferably placed under some slight initial compression so that the tension will be partially removed when they are allowed to expand during each revolution of the driving gear. As each spring is placed under tension and then released at each revolution of the gear it is released of any constant bearing tension and its resiliency is thus maintained. Due to the relatively slow speed of the gear 37 heating conditions which might injuriously effect the springs at high speed, can be ignored.

While we have shown and described, and have pointed out in the annexed claims, certain novel features of our invention, it will be understood that various omissions, substitutions and changes in the form and details of the device illustrated and in its operation may be made by those skilled in the art without departing from the spirit of the invention.

We claim:

1. In a device of the class described, the combination of a power transmission including a wheel, a power member operatively connected thereto to drive the same, a driven member having its axis of rotation normally coinciding with the axis of the wheel and spaced apart from said wheel, said driven member being mounted to have a freedom of movement axially across the plane of the wheel and a flexible driving connection normally disposed in the plane of the wheel and extending between said transmission and said driven member and in sliding engagement with the transmission.

2. In a device of the class described, the combination of a power shaft, a gear train with the first member of the train operatively connected to the shaft to be driven thereby, a driven member having a freedom of movement axially relative to the gear train and a flexible driving connection normally confined within the outlines of the last member of the gear train and extending between the last member of the gear train and said driven member and bodily movable relative to the gear train in a direction radially of said last member.

3. In a device of the class described, the combination of a driven member, a wing member including a collar fixed to said driven member and provided with diametrically extending driven arms, a pair of traveling rings rotatably mounted on said collar and each provided with a spring bearing positioned in the space on opposite sides of the driven arms, springs disposed between each driven arm and the adjacent bearing considered circumferentially, a driving member provided with diametrically disposed guiding slots facing toward the axis of the driving member and said traveling rings provided with arms pivoted thereto and mounted for reciprocatory movement radially of the driving member in said slots.

4. In a device of the class described, the combination of a driven member, a spring bearing member fixed thereto, a traveling ring mounted for rotary movement about the axis of said driven member and provided with a bearing member, a spring disposed between said bearing members, a driving member encircling said ring and driving connection between said driving member and said traveling ring.

5. In a device of the class described, the combination of a driven member, a spring bearing member fixed thereto, a traveling ring mounted for rotary movement about the axis of said driven member and provided with a bearing member, a spring disposed between said bearing members, a driving member encircling said ring and driving connection between said driving member and said traveling ring, said connection including a pivoted driving arm guided to travel radially of the plane of the driving member.

6. In a device of the class described, the combination with a driven member, a rotary power transmitting member fixed to said driven member, a driving member encircling said driven member and having a slight freedom of movement in all directions relative thereto and means for guiding one of said members relative to the other along a diameter of one of the members and along a line at right angles to said diameter whereby the angular movement of the driven member is maintained equal to the angular movement of the driving member in all driving positions of the members.

7. In a device of the class described, the combination of a driven shaft, a driven arm fixed thereto and extending radially therefrom, a traveling ring mounted for rotary movement about the axis of the shaft and provided with a spring bearing, a coiled spring disposed between said driven arm and bearing whereby rotary movement of the ring will be transmitted through the spring to the driven member, a driving member encircling said ring and a pivotal driving connection between said driving member and said ring.

8. In a device of the class described, the combination of a driven member, a spring bearing member fixed thereto, a traveling ring mounted for rotary movement about the axis of said driven member and provided with a bearing member, a spring disposed between said bearing members, a driving member encircling said ring and mounted for movement about two axes, one of said axis being transversely of the plane of the traveling rings and the other being disposed in the radius of said traveling rings.

9. In a device of the class described, the combination of a driven member, a spring bearing member fixed thereto, a traveling ring mounted for rotary movement about the axis of said driven member and provided with a bearing member, a spring disposed between said bearing members, a driving member encircling said ring and driving connection between said driving members and said traveling ring, said connection including means providing for movement of the axes of the driven member in two planes relative to the axis of the driving member.

10. In a device of the class described, the combination of a driven member, a spring bearing member fixed thereto, a traveling ring mounted for rotary movement about the axis of said driven member and provided with a bearing member, a spring disposed between said bearing members, a driving member encircling said ring and driving connection between said driving member and said traveling ring, said connection including a driving arm pivoted for movement about an axis extending substantially in the radius of the driving member and means for guiding said arm to travel radially of the plane of the driving member.

11. In a device of the class described, the combination of a driving member and a driven member disposed normally for rotary movement about a common axis and free to move axially relative to each other, a flexible driving connection between the members including a sliding connection with one of the members and a resilient connection between the sliding connection and the other member.

This specification signed this 28th day of June, 1920.

HOWARD J. MURRAY.
WALTER S. RUGG.